P. C. FRITZ.
Cooler for Grinding Mills.
No. 59,382. Patented Nov. 6, 1866.
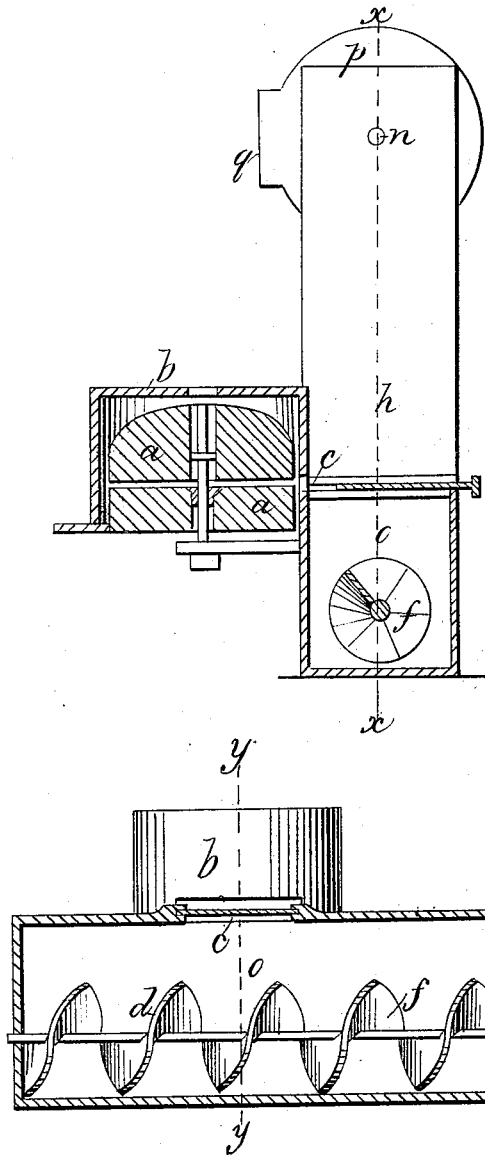
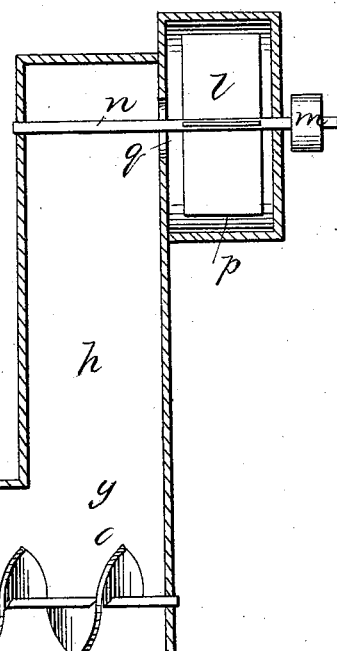
Witnesses
Inventor

UNITED STATES PATENT OFFICE.

P. C. FRITZ, OF BARRYTOWN, NEW YORK.

IMPROVEMENT IN COOLERS FOR GRINDING-MILLS.

Specification forming part of Letters Patent No. 59,382, dated November 6, 1866.

*To all whom it may concern:*

Be it known that I, P. C. FRITZ, of Barrytown, in the county of Dutchess and State of New York, have invented a new and Improved Cooler Attachment for Mills; and I do hereby declare that the following is a full, clear, and exact description thereof, which will enable those skilled in the art to make and use the same.

The present invention consists, principally, in causing a circulation of fresh and cool air to be maintained in and between the grinding-surfaces of the grindstones for grinding wheat, flour, &c., whereby the same are kept from becoming heated, which oftentimes seriously affects and injures the flour being ground, and also through the chamber in which the conveyer is arranged for carrying the flour as fast as ground and delivered from the stones to the bolting-mill, by means of which all moisture is carried off, leaving the flour dry, the advantages of which are manifest to all conversant with the grinding of flour.

In accompanying plate of drawings my improvements are illustrated, Figure 1 being a longitudinal vertical section through the conveyer-chamber, and taken in the plane of the line $x\ x$, Fig. 2, which is a transverse vertical section thereof, and of the millstones, taken in the plane of the line $y\ y$, Fig. 1.

$a\ a$ in the drawings represent the two grindstones, arranged as ordinarily with regard to each other, and surrounded and incased by a curb, $v$, having an opening, $c$, in one of its sides communicating with the chamber $o$, arranged alongside of the curb, with a conveyer, $d$, hung therein, consisting of a spiral screw-shaped shaft, $f$, to which conveyer motion is communicated in any proper manner. To the end $g$ of the conveyer-chamber is an upright or vertical spout, $n$, in the upper end of which is hung a fan-blower, $l$, made of any of the ordinary constructions, which fan-blower is revolved in any suitable manner by connecting the pulley $m$ of its shaft $n$ with the driving-power used. This fan-blower is arranged within a chamber, $p$, having an opening, $q$, communicating with the external air.

It is obvious that by revolving the fan-blower with great rapidity a draft or current of air is established down through the curb of the stones $a\ a$ and between their grinding-surfaces, and then through the conveyer-chamber, escaping therefrom at the opening of the fan-chamber; and by such draft of air the stones are necessarily kept from becoming heated to any great degree, and the moisture contained in the flour ground carried off, whereby a much better quality of flour can be produced and a more rapid grinding of the same obtained, as is manifest without further description.

What I claim as new, and desire to secure by Letters Patent, is—

The arrangement of the fan $l$, tube $h$, chamber $o$, and conveyer $d$ in relation to each other and to the stones $a$, as and for the purposes specified.

The above specification of my invention signed by me this 28th day of September, 1865.

P. C. FRITZ.

Witnesses:
M. M. LIVINGSTON,
C. L. TOPLIFF.